US012221030B2

(12) United States Patent
Yamamoto et al.

(10) Patent No.: US 12,221,030 B2
(45) Date of Patent: Feb. 11, 2025

(54) VEHICLE LIGHT FIXTURE SYSTEM, LIGHT DISTRIBUTION CONTROL DEVICE, AND LIGHT DISTRIBUTION CONTROL METHOD

(71) Applicant: KOITO MANUFACTURING CO., LTD., Tokyo (JP)

(72) Inventors: Hiroki Yamamoto, Shizuoka (JP); Motohiro Komatsu, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 18/331,287

(22) Filed: Jun. 8, 2023

(65) Prior Publication Data

US 2023/0311744 A1 Oct. 5, 2023

Related U.S. Application Data

(63) Continuation of application No. PCT/JP2021/044658, filed on Dec. 6, 2021.

(30) Foreign Application Priority Data

Dec. 15, 2020 (JP) ................ 2020-207612

(51) Int. Cl.
*F21S 41/675* (2018.01)
*B60Q 1/14* (2006.01)
(Continued)

(52) U.S. Cl.
CPC ............ *B60Q 1/143* (2013.01); *F21S 41/255* (2018.01); *F21S 41/663* (2018.01); *B60Q 2300/056* (2013.01); *F21W 2102/155* (2018.01)

(58) Field of Classification Search
CPC ............ B60Q 1/1423; B60Q 2300/056; B60Q 1/0023; B60Q 1/143; B60Q 1/085;
(Continued)

(56) References Cited

U.S. PATENT DOCUMENTS

2004/0052083 A1 3/2004 Daicho et al.
2011/0267455 A1 11/2011 Goetz et al.
(Continued)

FOREIGN PATENT DOCUMENTS

DE 102014204614 A1 9/2015
EP 1962226 A2 8/2008
(Continued)

OTHER PUBLICATIONS

International Preliminary Report on Patentability dated Jun. 13, 2023, by the International Bureau of WIPO for Application No. PCT/JP2021/044658. (10 pages).
(Continued)

*Primary Examiner* — Elmito Breval
(74) *Attorney, Agent, or Firm* — BUCHANAN, INGERSOLL & ROONEY PC

(57) ABSTRACT

A vehicle light fixture system includes: a low-beam unit adapted to form a low-beam light distribution pattern having a cutoff line and to independently adjust illuminance in a plurality of subareas in the low-beam light distribution pattern arranged below and along the cutoff line; and a light distribution control device that controls the low-beam unit to form a first reduced illuminance portion in, of the plurality of subareas, the subarea having a position in a vehicle width direction overlapping a position of a vehicle in front in the vehicle width direction.

18 Claims, 4 Drawing Sheets

(51) Int. Cl.
*F21S 41/255* (2018.01)
*F21S 41/663* (2018.01)
*F21W 102/155* (2018.01)

(58) Field of Classification Search
CPC .. B60Q 2300/314; F21S 41/657; F21S 41/25; F21S 41/365; F21S 41/675; F21V 23/0464; Y02B 20/40; G06V 20/584
See application file for complete search history.

(56) References Cited

U.S. PATENT DOCUMENTS

| | | | | |
|---|---|---|---|---|
| 2018/0106455 | A1* | 4/2018 | Uchida | F21S 41/675 |
| 2019/0143885 | A1* | 5/2019 | Sugimoto | G01M 11/064 |
| | | | | 362/466 |
| 2019/0384054 | A1* | 12/2019 | Mukojima | F21S 41/13 |
| 2020/0139879 | A1* | 5/2020 | Shibata | H04N 9/3185 |

FOREIGN PATENT DOCUMENTS

| | | |
|---|---|---|
| FR | 2995267 A1 | 3/2014 |
| JP | 2012134091 A | 7/2012 |
| JP | 2015149307 A | 8/2015 |
| JP | 2016203863 A | 12/2016 |
| WO | 2013051349 A1 | 4/2013 |

OTHER PUBLICATIONS

International Search Report (PCT/ISA/210) with translation and Written Opinion (PCT/ISA/237) dated Jan. 18, 2022, by the Japan Patent Office as the International Searching Authority for International Application No. PCT/JP2021/044658. (4 pages).

Extended European Search Report issued in EP Application No. 21906407.8; Mailed Feb. 28, 2024. 8 Pages.

* cited by examiner

VEHICLE LIGHT FIXTURE SYSTEM, LIGHT DISTRIBUTION CONTROL DEVICE, AND LIGHT DISTRIBUTION CONTROL METHOD

CROSS-REFERENCE TO RELATED APPLICATIONS

This application is based upon and claims the benefit of priority from the prior Japanese Patent Application No. 2020-207612, filed on Dec. 15, 2020 and the International Patent Application No. PCT/JP2021/044658, filed on Dec. 6, 2021, the entire content of each of which is incorporated herein by reference.

BACKGROUND

Field of the Invention

The present invention relates to a vehicle light fixture system, a light distribution control device, and a light distribution control method.

Description of the Related Art

A vehicle light fixture plays an important role in safe driving at night or in a tunnel. Illuminating a wide range in front of a vehicle brightly with a view to prioritizing viewability for the driver has a problem in that the driver of a vehicle in front such as a leading vehicle and an oncoming vehicle may experience glare. The vehicle light fixture according to the related art has addressed this by forming a low-beam light distribution pattern including a cutoff line to reduce glare experienced by the driver of the vehicle in front (see, for example, patent literature 1).

Recently, adaptive driving beam (ADB) control for controlling a high-beam light distribution pattern dynamically and adaptively based on the condition around a vehicle is proposed. ADB control is configured to detect whether a vehicle in front is found with a camera, etc. and dims or turns off light in an area corresponding to the vehicle in front. Changing a high-beam light distribution in accordance with the position of the vehicle in front can reduce glare experienced by the driver of the vehicle in front, etc. and, at the same time, improve viewability for the driver of the driver's vehicle.

Patent Literature 1: JP2012-134091

We have actively studied light distribution control in vehicle light fixtures and have found out that there is a room in related-art light distribution control for further reduction in glare experienced by the driver of the vehicle in front.

SUMMARY OF THE INVENTION

The present invention addresses the issue, and an illustrative purpose thereof is to provide a technology for reducing glare experienced by the driver of a vehicle in front.

An aspect of the present invention relates to a vehicle light fixture system. The vehicle light fixture system includes: a low-beam unit adapted to form a low-beam light distribution pattern having a cutoff line and to independently adjust illuminance in a plurality of subareas in the low-beam light distribution pattern arranged below and along the cutoff line; and a light distribution control device that controls the low-beam unit to form a first reduced illuminance portion in, of the plurality of subareas, the subarea having a position in a vehicle width direction overlapping a position of a vehicle in front in the vehicle width direction.

Another aspect of the present invention relates to a light distribution control device adapted to control a low-beam unit adapted to form a low-beam light distribution pattern having a cutoff line and to independently adjust illuminance in a plurality of subareas in the low-beam light distribution pattern arranged below and along the cutoff line. The light distribution control device controls the low-beam unit to form a first reduced illuminance portion in, of the plurality of subareas, the subarea having a position in a vehicle width direction overlapping a position of a vehicle in front in the vehicle width direction.

Still another aspect of the present invention relates to a light distribution control method adapted to control formation of a low-beam light distribution pattern having a cutoff line. The light distribution control method includes forming a first reduced illuminance portion in, of a plurality of subareas in the low-beam light distribution pattern arranged below and along the cutoff line, the subarea having a position in a vehicle width direction overlapping a position of a vehicle in front in the vehicle width direction.

Optional combinations of the aforementioned constituting elements, and implementations of the present invention in the form of methods, apparatuses, and systems may also be practiced as additional modes of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
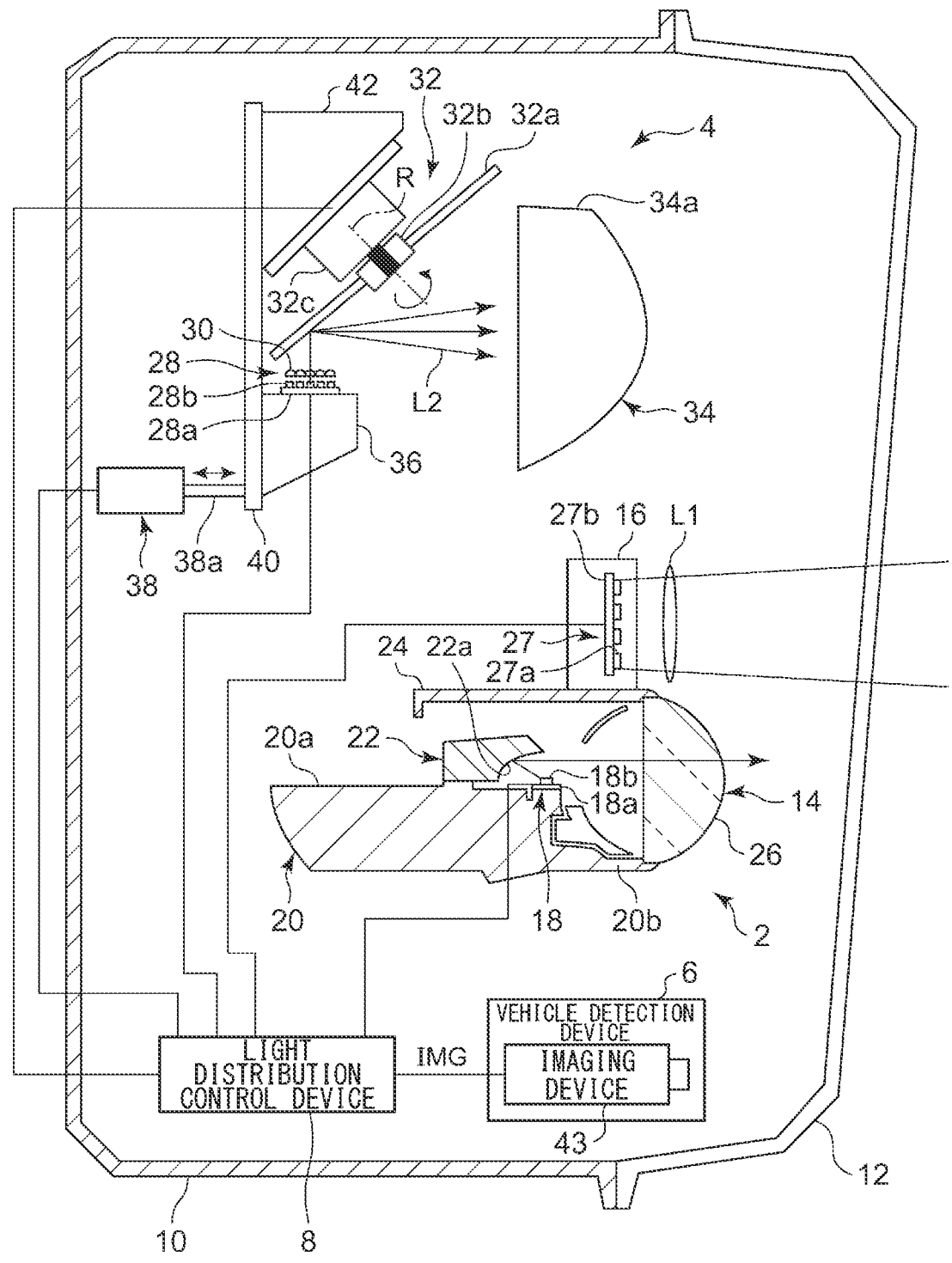
FIG. 1 shows a schematic configuration of a vehicle light fixture system according to the embodiment.

Hereinafter, the invention will be described based on preferred embodiments with reference to drawings. The embodiments do not limit the scope of the invention but exemplify the invention. Not all of the features and the combinations thereof described in the embodiments are necessarily essential to the invention. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless otherwise specified and are used to distinguish a certain feature from the others. Those of the members that are not material to the description of the embodiments are omitted in the drawings.

FIG. 1 shows a schematic configuration of a vehicle light fixture system 1 according to the embodiment. FIG. 1 depicts some of the constituting elements of the vehicle light fixture system 1 as functional blocks. The functional blocks are implemented in hardware such as devices and circuits exemplified by a CPU and a memory of a computer, and in software such as a computer program. It will be understood by those skilled in the art that these functional blocks are implemented in a variety of manners by a combination of hardware and software.

The vehicle light fixture system 1 includes a low-beam unit 2, an ADB unit 4, a vehicle detection device 6, and a light distribution control device 8. The vehicle light fixture system 1 of the embodiment also includes a lamp body having an opening on the frontward side of the vehicle and a translucent cover 12 attached to cover the opening of the lamp body 10. The lamp body 10 and the translucent cover 12 form a lamp chamber. The low-beam unit 2, the ADB unit 4, the vehicle detection device 6, and the light distribution control device 8 are housed in the lamp chamber. The vehicle detection device 6 and the light distribution control device 8 may be provided outside the lamp chamber, and, for example, on the side of the vehicle. For example, the vehicle detection device 6 can be formed by a vehicle-mounted camera. Further, the light distribution control device 8 can be formed by a vehicle ECU. Further, the low-beam unit 2 and the ADB unit 4 may be housed in separate lamp chambers.

The low-beam unit 2 includes a first illuminator 14 and a second illuminator 16. The first illuminator 14 and the second illuminator 16 are fixed to the lamp body 10 by a known link mechanism (not shown) such that the light axes of the respective illuminators are adjustable in the horizontal direction and the vertical direction.

The first illuminator 14 of the embodiment is a light fixture unit of so-called projector type (diffusing lens optical system) and includes a first light source 18, a first heatsink 20, a reflector 22, a lens holder 24, and a first projection lens 26.

The first light source 18 has a structure in which a light-emitting element 18b is provided on a circuit substrate 18a. The circuit substrate 18a is a heat conductive insulated substrate made of ceramic or the like. An electrode for transmitting power to the light-emitting element 18b is formed on the circuit substrate 18a. The light-emitting element 18b is, for example, a light-emitting diode (LED). The light-emitting element 18b may be a semiconductor light-emitting element other than an LED such as a laser diode (LD) and an organic or inorganic electroluminescence (EL) element. The first light source 18 may be comprised of an incandescent lamp, a halogen lamp, a discharge lamp, etc. The first light source 18 is mounted on the first heatsink 20.

The first heatsink 20 is a heat dissipation member that dissipates the heat of the first light source 18. The first heatsink 20 has flat part 20a, and the first light source 18 is mounted on the flat part 20a. Further, the reflector 22 is mounted on the flat part 20a. The reflector 22 has a reflecting surface 22a. The reflecting surface 22a is comprised of, for example, a portion of a paraboloid of revolution. The relative positions of the reflector 22 and the first light source 18 are defined such that the light-emitting element 18b is located near the focal point of the reflecting surface 22a. The first heatsink 20 has a projecting part 20b that projects frontward in the light fixture. The leading end of the projecting part 20b is in contact with the outer circumferential part of the first projection lens 26 and supports the first projection lens 26.

Further, the lens holder 24 is linked to the projecting part 20b. Of the outer circumferential part of the first projection lens 26, the lens holder 24 is contact with a part not linked to the projecting part 20b and supports the first projection lens 26 accordingly. The first projection lens 26 is fixed on the light axis of the first illuminator 14 such that the entirety of the outer circumferential part of the first projection lens 26 is surrounded by the projecting part 20b and the lens holder 24. The first projection lens 26 is an optical member that diffuses the light of the first light source 18 in a vehicle width direction (horizontal direction) to radiate the light in a space in front of the light fixture. By way of one example, the first projection lens 26 is a cylindrical lens having a convex front surface and a flat rear surface and having a focal line extending in the horizontal direction.

The light output from the first light source 18 is reflected by the reflecting surface 22a of the reflector 22 toward the first projection lens 26. The light reflected by the reflecting surface 22a enters the first projection lens 26, diffused by the first projection lens 26 in the vehicle width direction and projected to a front area.

The second illuminator 16 is comprised of a variable light distribution lamp capable of radiating a variable intensity visible light beam L1 to an area in front of the driver's vehicle. The second illuminator 16 of the embodiment includes a light source array 27. The light source array 27 includes multiple light sources 27a arranged in a matrix and a circuit substrate 27b that turns on or off the respective light sources 27a in a mutually independent manner. Preferred examples of the light source 27a include a semiconductor light-emitting element such as LED, LD, and organic or inorganic EL element.

The ADB unit 4 is fixed to the lamp body 10 by a known link mechanism (not shown) such that the light axis of the ADB unit 4 is adjustable in the horizontal direction and the vertical direction. The ADB unit 4 is comprised of a variable light distribution lamp capable of radiating a variable intensity distribution visible light beam L2 to an area in front of the driver's vehicle. The ADB unit 4 of the embodiment is a light fixture unit of scan optical type and includes a second light source 28, a condensing lens 30, a rotatable reflector 32, a second projection lens 34, a second heatsink 36, and a driving mechanism 38.

The second light source 28 has a structure in which multiple light-emitting elements 28b are arranged on the circuit substrate 28a. The light-emitting elements 28b are configured to be turned on or off individually. A semiconductor light-emitting element such as LED, LD, and organic or inorganic EL element can be used as the light-emitting element 28b. The second light source 28 may be comprised of an incandescent lamp, a halogen lamp, a discharge lamp, etc. The condensing lens 30 is an optical member that changes the light path of the light output from the second light source 28 to travel toward a blade 32a of the rotatable reflector 32.

The rotatable reflector 32 is an optical member rotated around a rotational axis R while reflecting the light output from the second light source 28. The rotatable reflector 32 includes multiple blades 32a, a rotatable cylinder 32b, and a motor 32c as a drive source. The multiple blades 32a function as a surface for reflecting light and are fixed to the circumferential surface of the rotatable cylinder 32b. The rotatable cylinder 32b is fixed to the output shaft of the motor 32c such that the orientation thereof is defined to align the central axis of the cylinder with the output shaft of the motor 32c. The output shaft of the motor 32c and the central axis of the rotatable cylinder 32b are aligned with the rotational axis R of the rotatable reflector 32. When driven by the motor 32c, the blade 32a swivels around the rotational axis R in one direction. The blade 32a scans an area in front of the light fixture by swiveling and reflecting the light of the second light source 28.

The second projection lens 34 is an optical member that projects the light reflected by the rotatable reflector 32 to an area in front of the light fixture. The second projection lens 34 is comprised of, for example, a plano-convex aspherical lens. Further, the second projection lens 34 of the embodiment has a cutout part 34a in a part of the outer circumference. The presence of the cutout part 34a makes it difficult for the blade 32a of the rotatable reflector 32 to interfere with the second projection lens 34 and brings the second projection lens 34 and the rotatable reflector 32 closer to each other.

The second heatsink 36 is a heat dissipation member that dissipates the heat of the second light source 28. The second heatsink 36 is provided opposite to the rotatable reflector 32 across the second light source 28. The second light source 28 is fixed on a surface of the second heatsink 36 facing the rotatable reflector 32.

The ADB unit 4 includes a lamp bracket 40. Each member of the ADB unit 4 is supported by the lamp body 10 via the lamp bracket 40. The lamp bracket 40 is, for example, a plate-shaped member provided such that the principal surface thereof faces the longitudinal direction of the light fixture, and the second heatsink 36 is fixed to the principal surface facing the front side of the light fixture. The second light source 28 is fixed to the lamp bracket 40 via the second heatsink 36. The rotatable reflector 32 is fixed to the lamp bracket 40 via a seat 42. The second projection lens 34 is fixed to the lamp bracket 40 via a lens holder (not shown).

The driving mechanism 38 is joined to the principal surface of the lamp bracket 40 facing the rear side of the light fixture. The driving mechanism 38 is comprised of, for example, a leveling actuator. The driving mechanism 38 includes a rod 38a and a motor, etc. that extends or contracts the rod 38a in the longitudinal direction of the light fixture. The leading end of the rod 38a is fixed to the lamp bracket 40. The ADB unit 4 is inclined rearward as the rod 38a is extended. Further, the ADB unit 4 is inclined forward as the rod 38a is contracted. Therefore, the pitch angle of the light axis of the ADB unit 4 can be leveled by driving the ADB unit 4 by the driving mechanism 38.

The structure of the low-beam unit 2 and the ADB unit 4 is by way of one example only and is not limited to the one described above. For example, the first illuminator 14 may be a light fixture unit of reflective type (parabolic optical system). In other words, the first illuminator 14 may have, as an optical member to diffuse the light of the first light source 18 in the vehicle width direction, a reflector instead of the first projection lens 26. The reflector will have a reflecting surface comprised of, for example, a parabolic cylindrical surface. The light-emitting element 18b will be located near the focal point of the reflecting surface and fixed to the first heatsink 20.

The second illuminator 16 may be a pattern formation device of matrix type such as a digital mirror device (DMD) and a liquid crystal device or a pattern formation device of optical scan type configured to scan an area in front of the driver's vehicle with a light from a light source. The ADB unit 4 may be a light source array or a pattern formation device of matrix type. Further, the low-beam unit 2 and the ADB unit 4 may be integrated.

The vehicle detection device 6 detects a vehicle in front located in an area in front of the driver's vehicle. The vehicle in front is inclusive of a leading vehicle and an oncoming vehicle. The vehicle detection device 6 of the embodiment includes an imaging device 43 as a means of detecting a vehicle in front. The imaging device 43 has sensitivity in the visible light zone and images a front area to generate an image IMG. The vehicle detection device 6 transmits, as a detection result, the image IMG generated by the imaging device 43 to the light distribution control device 8.

The vehicle detection device 6 may include other detection means such as a ranging sensor. The ranging sensor is adapted to measure a frontal area and acquires information in the frontal area. The ranging sensor may be comprised of, for example, a millimeter-wave laser, a light detection and ranging or laser imaging detection and ranging (LiDAR). The ranging sensor can acquire, based on an interval from a point of time that a millimeter wave or light is output to a frontal area to a point of time that a reflected wave or reflected light is detected, the presence of a vehicle in front associated with the reflected wave or reflected light and a distance to the vehicle in front. Further, information related to the movement of the vehicle in front can be acquired by storing the distance data in association with the position of detection of the vehicle in front.

The light distribution control device 8 controls formation of a light distribution pattern by the low-beam unit 2 and the ADB unit 4 based on the detection result of the vehicle detection device 6. The light distribution control device 8 may be comprised of a digital processor. For example, light distribution control device 8 may be comprised of a combination of a microcomputer, including a CPU, and a software program. The light distribution control device 8 may alternatively be comprised of a field programmable gate array (FPGA), an application specified IC (ASIC), or the like. The light distribution control device 8 operates such that integrated circuit constituting the light distribution control device 8 runs a program stored in a memory.

Figure 2A:
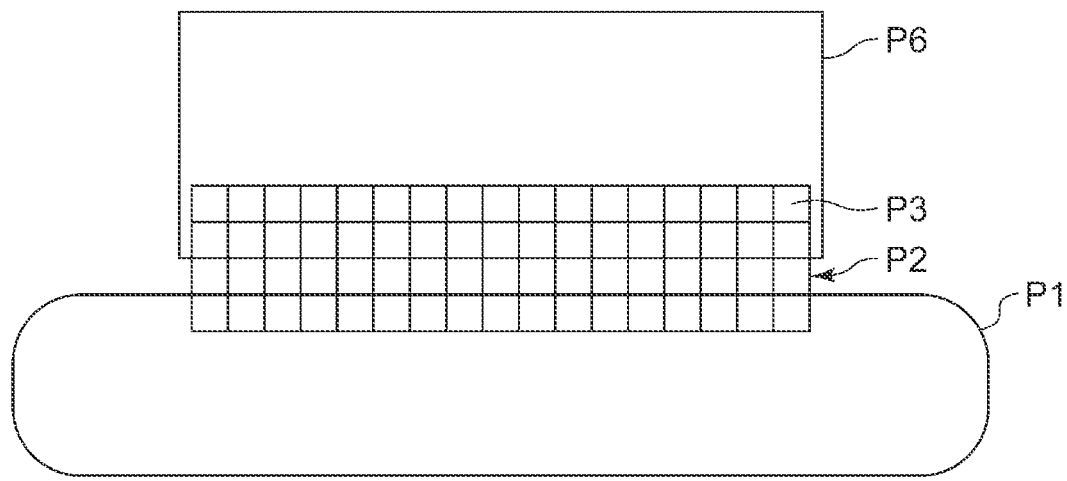
FIG. 2A schematically shows a range in which the low-beam unit and the ADB unit can radiate light.
Figure 2B:
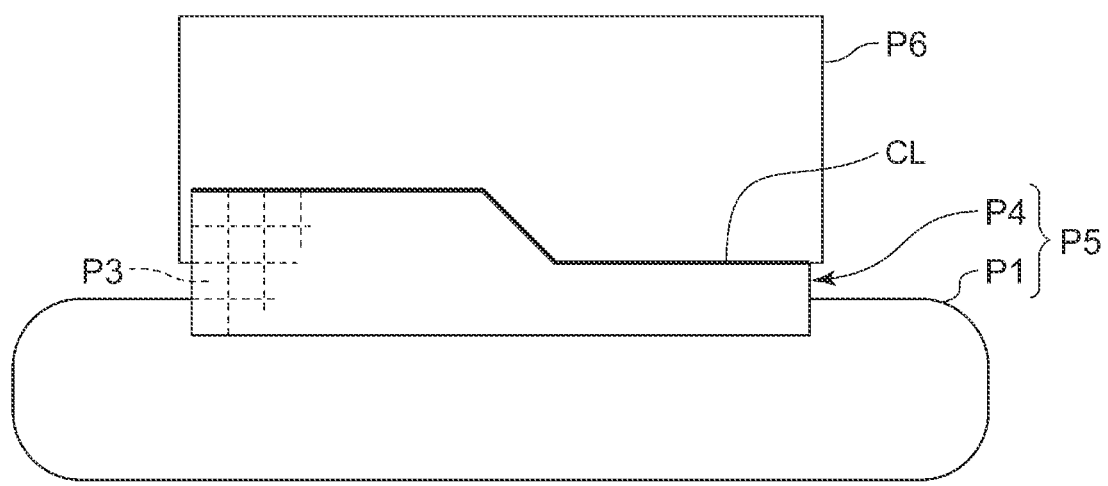
FIG. 2B schematically shows a low-beam light distribution pattern and an ADB light distribution pattern.
Figure 3:
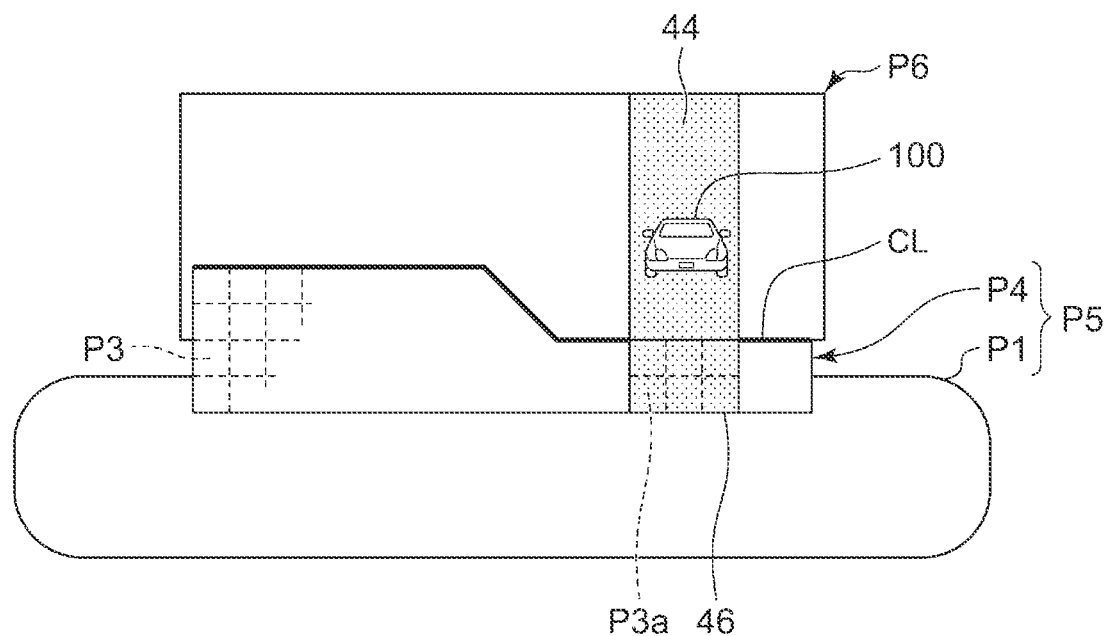
FIG. 3 is a schematic diagram showing a light distribution pattern formed when a vehicle in front is detected.

A description will be given of the shape of a light distribution pattern formed by the respective light fixture units and light distribution pattern formation control by the light distribution control device 8. FIG. 2A schematically shows a range in which the low-beam unit 2 and the ADB unit 4 can radiate light. FIG. 2B schematically shows a low-beam light distribution pattern P5 and an ADB light distribution pattern P6. FIG. 3 is a schematic diagram showing a light distribution pattern formed when a vehicle in front is detected. The relative positions of the illuminated ranges may be displaced from what are shown in FIG. 2A. Similarly, the relative positions of the respective light distribution patterns may be displaced from what are shown in FIG. 2B and FIG. 3. A light distribution pattern is understood to be a two-dimensional illuminance distribution of an irradiation pattern that each unit forms on a vertical virtual screen in front of the driver's vehicle.

The first illuminator 14 can form a diffusion pattern P1 as shown in FIG. 2A and FIG. 2B by radiating the light of the first light source 18. The diffusion pattern P1 is a pattern below the H line with a pitch angle of 0° and extending outside the cutoff line CL described later in the vehicle width direction.

The second illuminator 16 can form a variable light distribution pattern P2 above the diffusion pattern P1 as shown in FIG. 2A by radiating light of multiple light sources 27a. At least a portion of the variable light distribution pattern P2 is formed in an area above the diffusion pattern P1. The variable light distribution pattern P2 has a structure in which multiple subareas P3 arranged in a matrix are aggregated. By way of one example, each subarea P3 corresponds to each light source 27a one by one. By adjusting the respective light sources 27a to be turned on or off, it is possible to adjust the illuminance in the subareas P3 in a mutually independent manner.

By adjusting the illuminance in each subarea P3, the second illuminator 16 can form a cutoff line pattern P4 as shown in FIG. 2B. The cutoff line pattern P4 includes a cutoff line CL and multiple subareas P3. The cutoff line CL is located above the diffusion pattern P1. The cutoff line CL is a boundary between a subarea P3 located above the cutoff line CL and having a relatively low illuminance (preferably, 0 illuminance) and a subarea P3 located below the cutoff line CL and having a relatively high illuminance and has a publicly known shape. By way of one example, the cutoff line CL includes a first portion extending horizontally on the side of an oncoming traffic lane, a second portion extending horizontally on the side of the driver's vehicle at a position higher than the first portion, and a third portion extending diagonally between the first portion and the second portion and connecting the portions. The multiple subareas P3 are arranged below the cutoff line CL and along the cutoff line CL. Further, the multiple subareas P3 are also arranged in a direction orthogonal to the cutoff line CL in this embodiment.

The low-beam unit 2 of the embodiment forms a low-beam light distribution pattern P5 by synthesizing the diffusion pattern P1 and the cutoff line pattern P4. Therefore, the low-beam light distribution pattern P5 includes the diffusion pattern P1 extending in the vehicle width direction, the cutoff line CL located above the diffusion pattern P1, and the multiple subareas P3 located below the cutoff line CL.

The ADB unit 4 can form the ADB light distribution pattern P6 as shown in FIG. 2A and FIG. 2B by a combination of turning on/off the second light source 28, rotation of the rotatable reflector 32, and driving by the driving mechanism 38. At least a portion of the ADB light distribution pattern P6 is formed in an area above the cutoff line CL. By way of one example, the ADB light distribution pattern P6 is formed in an area where a publicly known high-beam light distribution pattern should be formed. When the vehicle detection device 6 detects a vehicle in front, further, the ADB light distribution pattern P6 is configured to include a second reduced illuminance portion 44 overlapping the vehicle in front as shown in FIG. 3. Formation of the second reduced illuminance portion 44 is controlled by the light distribution control device 8. When a vehicle in front is found, the light distribution control device 8 controls formation a light distribution pattern by the low-beam unit 2 and the ADB unit 4 as described below. In other words, the light distribution control device 8 identifies the position of a vehicle in front 100 based on the detection result of the vehicle detection device 6. The position of the vehicle in front 100 identified by the light distribution control device 8 includes a position (angle) in the vehicle width direction of the driver's vehicle. When the light distribution control device 8 acquires the image IMG as the detection result of the vehicle detection device 6, the light distribution control device 8 can identify the position of the vehicle in front 100 by publicly known image process or image analysis.

The light distribution control device 8 defines the second reduced illuminance portion 44 overlapping the vehicle in front 100 in the ADB light distribution pattern P6. The light distribution control device 8 controls the ADB unit 4 to form the ADB light distribution pattern P6 that includes the second reduced illuminance portion 44. The second reduced illuminance portion 44 of the embodiment is a light shielding portion having a substantially 0 illuminance. The second reduced illuminance portion 44 may be a light reducing portion having a higher illuminance than the light shielding portion and a lower illuminance than the areas other than the light shielding portion. The illuminance in the second reduced illuminance portion 44 can be defined as appropriate based on an experiment or simulation, considering a level of glare experienced by the driver of the vehicle in front, etc.

Further, the light distribution control device 8 defines, of the multiple subareas P3 in the low-beam light distribution pattern P5, the subarea P3 that overlaps the vehicle in front 100 in respect of the position in the vehicle width direction to be a particular subarea P3a. Therefore, the position of the particular subarea P3a in the vehicle width direction of the driver's vehicle overlaps the position of the vehicle in front 100 in the vehicle width direction. The light distribution control device 8 controls the low-beam unit 2 so that the illuminance in the particular subarea P3a is lower than the illuminance in the other subareas P3. In this way, a first reduced illuminance portion 46 is formed in the particular subarea P3a. The first reduced illuminance portion 46 can be comprised of multiple subareas P3.

The light distribution control device 8 of the embodiment defines the first reduced illuminance portion 46 with reference to the position of the second reduced illuminance portion 44. In other words, the light distribution control device 8 defines, of the multiple subareas P3 in the low-beam light distribution pattern P5, the subarea P3 having a position in the vehicle width direction overlapping the position of the second reduced illuminance portion 44 in the vehicle width direction to be the particular subarea P3a. The light distribution control device 8 forms the first reduced illuminance portion 46 in the particular subarea P3a. The embodiment is not limited to this, and the light distribution control device 8 may define the first reduced illuminance portion 46 from the detection result of the vehicle detection device 6.

The range of the first reduced illuminance portion 46 in the height direction, i.e., the proportion of the subareas P3 below the cutoff line CL defined to be the particular subarea P3a, can be defined as appropriate based on an experiment or simulation, considering a pitching range of the driver's vehicle, etc.

Figure 4:
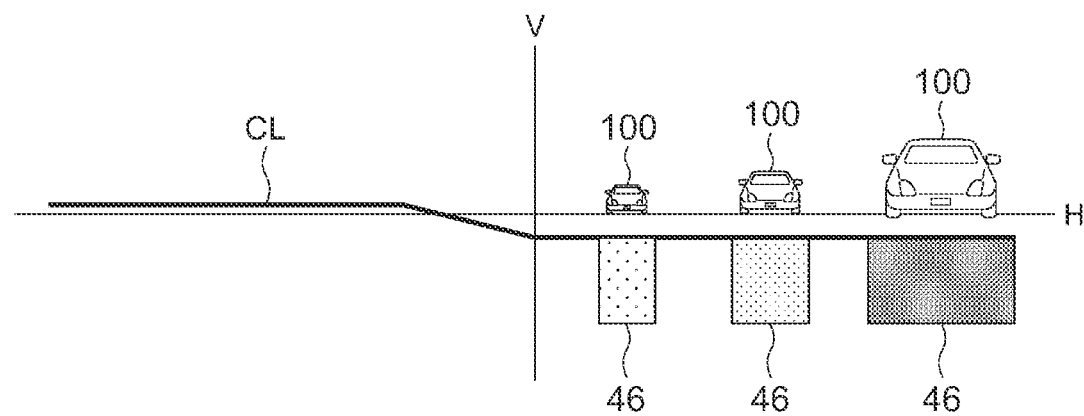
FIG. 4 is a schematic diagram showing a method of setting the illuminance in the first reduced illuminance portion.

Further, the light distribution control device 8 defines the illuminance in the first reduced illuminance portion 46 as follows. FIG. 4 is a schematic diagram showing a method of setting the illuminance in the first reduced illuminance portion 46. By way of one example, the light distribution control device 8 lowers the illuminance in the first reduced illuminance portion 46 as the distance from the driver's vehicle to the vehicle in front 100 becomes smaller. The light distribution control device 8 can identify the distance to the vehicle in front 100 based on the detection result of the ranging sensor provided in the vehicle detection device 6. Further, the dimension of the vehicle in front 100 in the image IMG tends to be larger as the vehicle in front 100 approaches the driver's vehicle. Thus, the distance to the vehicle in front 100 can be calculated from the dimension of the vehicle in front 100 in the vehicle width direction in the image IMG. For example, the light distribution control device 8 maintains a conversion table that maps a distance to the vehicle in front 100 to the illuminance in the first reduced illuminance portion 46 in advance. The light distribution control device 8 uses this conversion table to define the illuminance in the first reduced illuminance portion 46. The dimension of the second reduced illuminance portion 44 in the vehicle width direction may be defined to be the dimension of the vehicle in front 100 in the vehicle width direction.

Further, the distance from the driver's vehicle to the vehicle in front 100 can be estimated from the position of the vehicle in front 100 or the first reduced illuminance portion 46 in the vehicle width direction. In other words, the vehicle in front 100 tends to move outward in the vehicle width direction with respect to the driver's vehicle as the vehicle in front 100 approaches the driver's vehicle. When the vehicle in front 100 moves outward in the vehicle width direction, the first reduced illuminance portion 46 also moves outward in the vehicle width direction. Thus, the light distribution control device 8 according to an alternative example lowers the illuminance in the first reduced illuminance portion 46 as the vehicle in front 100 is positioned more outward in the vehicle width direction or as the first reduced illuminance portion 46 is positioned more outward in the vehicle width direction. For example, the light distribution control device 8 maintains a conversion table that maps the position of the vehicle in front 100 or the first reduced illuminance portion 46 in the vehicle width direction to the illuminance. The light distribution control device 8 defines the illuminance in the first reduced illuminance portion 46 by using the conversion table. The position of the vehicle in front 100 or the first reduced illuminance portion 46 in the vehicle width direction is defined with reference to the center in the vehicle width direction, to the inward or outward end in the vehicle width direction, etc. The position of the second reduced illuminance portion 44 in the vehicle width direction may be defined as the position of the vehicle in front 100 in the vehicle width direction.

Further, the distance from the driver's vehicle to the vehicle in front 100 can be estimated from the dimension of the vehicle in front 100 or the first reduced illuminance portion 46 in the vehicle width direction. In other words, as described above, the dimension of the vehicle in front 100 in the image IMG tends to be larger as it approaches the driver's vehicle. As the vehicle in front 100 becomes larger, the first reduced illuminance portion 46 will also become larger. In this regard, the light distribution control device 8 according to an alternative example lowers the illuminance in the first reduced illuminance portion 46 as the dimension of the vehicle in front 100 in the vehicle width direction becomes larger or as the dimension of the first reduced illuminance portion 46 in the vehicle width direction becomes larger. For example, the light distribution control device 8 maintains a conversion table that maps the dimension of the vehicle in front 100 or the first reduced illuminance portion 46 in the vehicle width direction to the illuminance. The light distribution control device 8 uses this conversion table to define the illuminance in the first reduced illuminance portion 46. The dimension of the second reduced illuminance portion 44 in the vehicle width direction may be defined as the dimension of the vehicle in front 100 in the vehicle width direction.

The distance to the vehicle in front 100, the position of the vehicle in front 100 or the first reduced illuminance portion 46, the illuminance in the first reduced illuminance portion 46 in response to the respective size of the vehicle in front 100 or the first reduced illuminance portion 46 can be set as appropriate based on an experiment or simulation, considering a level of glare experienced by the driver of the vehicle in front.

Figure 5:
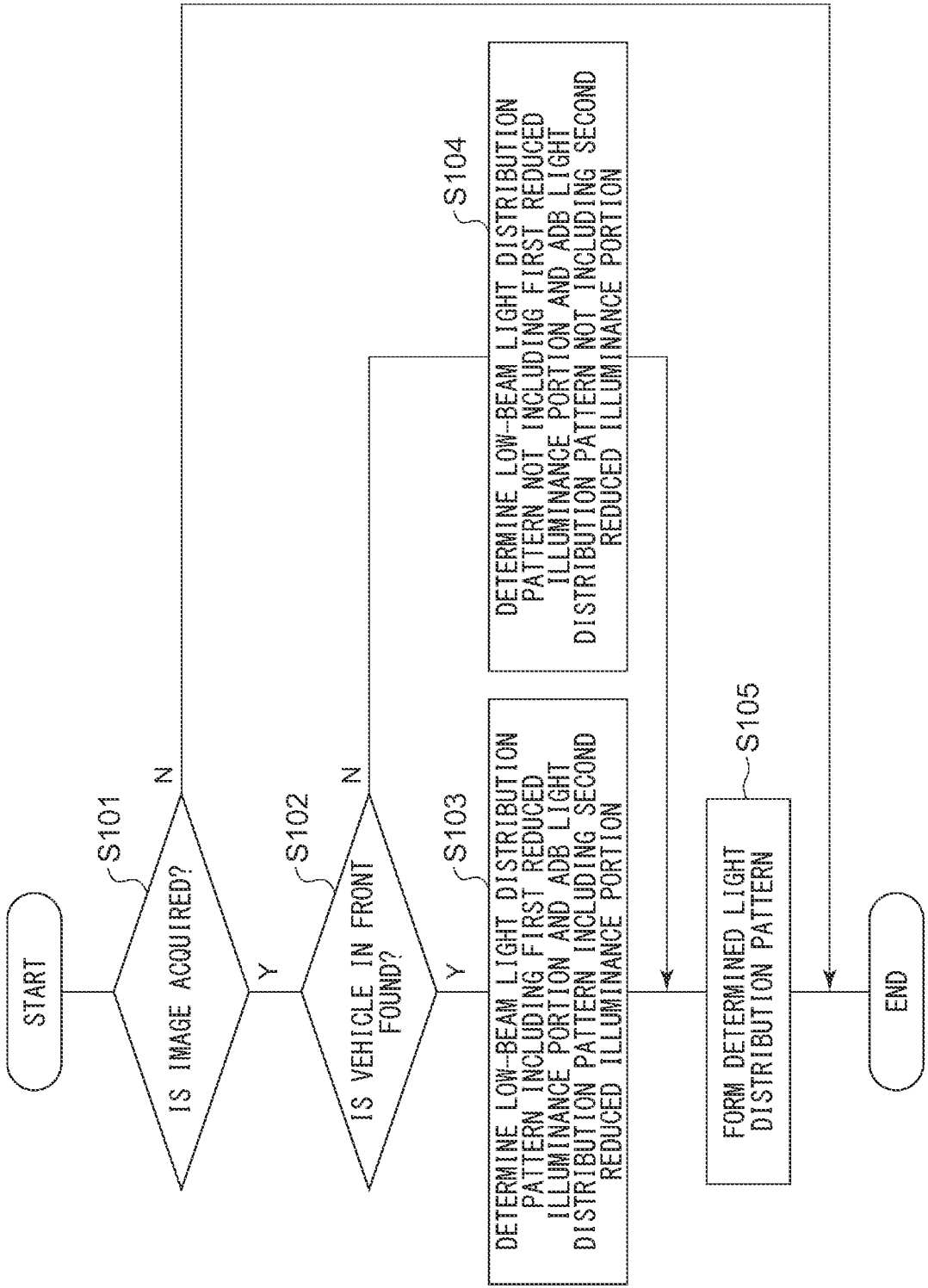
FIG. 5 is a flowchart showing exemplary light distribution control executed by the light distribution control device.

FIG. 5 is a flowchart showing exemplary light distribution control executed by the light distribution control device 8. The flow is executed repeatedly in a predetermined timing schedule when an instruction for execution of light distribution control is provided via a light switch (not shown) and when the ignition is on. A case where the image IMG is used as the detection result of the vehicle detection device 6 will be illustrated.

The light distribution control device 8 determines whether an image IMG is acquired (S101). When the image IMG is not acquired (N in S101), the routine is terminated. When the image IMG is acquired (Y in S101), the light distribution control device 8 uses the image IMG to determine whether the vehicle in front 100 is found (S102). When the vehicle in front 100 is found (Y in S102), the light distribution control device 8 determines the low-beam light distribution pattern P5 including the first reduced illuminance portion 46 and the ADB light distribution pattern P6 including the second reduced illuminance portion 44 (S103).

When the vehicle in front 100 is not found (N in S102), the light distribution control device 8 determines the low-beam light distribution pattern P5 not including the first reduced illuminance portion 46 and the ADB light distribution pattern P6 not including the second reduced illuminance portion 44 (S104). The light distribution control device 8 controls the low-beam unit 2 and the ADB unit 4 to form the low-beam light distribution pattern P5 and the ADB light distribution pattern P6 thus determined (S105), and the routine is terminated.

As described above, the vehicle light fixture system 1 according to the embodiment includes the low-beam unit 2 and the light distribution control device 8. The low-beam unit 2 can form the low-beam light distribution pattern P5 having the cutoff line CL and can adjust the illuminance in the multiple subareas P3 in the low-beam light distribution pattern P5 arranged below and along the cutoff line CL. The light distribution control device 8 controls the low-beam unit 2 to form the first reduced illuminance portion 46 in, of the multiple subareas P3, the subarea P3 (the particular subarea P3a) having a position in the vehicle width direction overlapping the position of the vehicle in front 100 in the vehicle width direction.

Forming the second reduced illuminance portion 44 in the ADB light distribution pattern P6 reduces glare experienced by the driver of the vehicle in front 100 due to the ADB light distribution pattern P6. When the driver's vehicle pitches due to irregularities on the surface of the road being traveled, however, pitching may cause the low-beam light distribution pattern P5 to irradiate the driver of the vehicle in front. Irradiation by the low-beam light distribution pattern P5 may cause the driver of the vehicle in front 100 to experience glare.

By addressing this by forming, in the low-beam light distribution pattern P5, the first reduced illuminance portion 46 in the subarea P3 aligned with the vehicle in front 100 in respect of the position in the vehicle width direction, the first reduced illuminance portion 46 can be caused to overlap the vehicle in front 100 when the driver's vehicle pitches. This can reduce glare experienced by the driver of the vehicle in front 100 due to the low-beam light distribution pattern P5. Accordingly, glare experienced by the driver of the vehicle in front 100 can be reduced more successfully than in the related-art ADB control.

Further, by way of one example, the light distribution control device 8 of the embodiment lowers the illuminance in the first reduced illuminance portion 46 as the distance to the vehicle in front 100 becomes smaller. Generally, the closer the vehicle in front 100, the more likely the driver of the vehicle in front 100 experiences glare due to light irradiation from the driver's vehicle. Therefore, glare experienced by the driver of the vehicle in front 100 can be reduced more successfully by lowering the illuminance in the first reduced illuminance portion 46 as the distance to the vehicle in front 100 becomes smaller. Further, viewability for the driver of the driver's vehicle can be prevented from being reduced by increasing the illuminance in the first reduced illuminance portion 46 corresponding to the vehicle in front 100 at a distance.

By way of an alternative example, the light distribution control device 8 of the embodiment lowers the illuminance in the first reduced illuminance portion 46 as the vehicle in front 100 or the first reduced illuminance portion 46 is positioned more outward in the vehicle width direction. Thus, light distribution control can be simplified by substituting, in place of the distance to the vehicle in front 100, the position of the vehicle in front 100 or the first reduced illuminance portion 46 in the vehicle width direction as the criterion for determining the illuminance in the first reduced illuminance portion 46. As a result, faster light distribution control and reduction in the load on the light distribution control device 8 can be achieved.

By way of an alternative example, the light distribution control device 8 of the embodiment lowers the illuminance in the first reduced illuminance portion 46 as the dimension of the vehicle in front 100 or the first reduced illuminance portion 46 in the vehicle width direction becomes larger. Thus, light distribution control can be simplified by changing the criterion for defining the illuminance in the first reduced illuminance portion 46 from the distance to the vehicle in front 100 to the dimension of the vehicle in front 100 or the first reduced illuminance portion 46 in the vehicle width direction. As a result, faster light distribution control and reduction in the load on the light distribution control device 8 can be achieved.

The low-beam light distribution pattern P5 of the embodiment includes the diffusion pattern P1 extending in the vehicle width direction, the cutoff line CL located above the diffusion pattern P1, and the multiple subareas P3 located below the cutoff line CL. The low-beam unit 2 includes: the first illuminator 14 that includes the optical member (the first projection lens 26 and the reflector) for diffusing the light of the first light source 18 in the vehicle width direction and forms the diffusion pattern P1; and the second illuminator 16 that has a structure in which the multiple light sources 27a that can be turned on or off independently are arranged and forms the cutoff line CL and the multiple subareas P3. This can form the first reduced illuminance portion 46 in the low-beam light distribution pattern P5.

Further, the vehicle light fixture system 1 of the embodiment includes the ADB unit 4 capable of forming the ADB light distribution pattern P6 at least a portion of which is formed in an area above the cutoff line CL and which includes the second reduced illuminance portion 44 that overlaps the vehicle in front 100. The light distribution control device 8 defines the second reduced illuminance portion 44 in the ADB light distribution pattern P6 and defines the first reduced illuminance portion 46 in, of the multiple subareas P3 in the low-beam light distribution pattern P5, the subarea P3 having a position in the vehicle width direction overlapping the position of the second reduced illuminance portion 44 in the vehicle width direction. This can form the first reduced illuminance portion 46 in the low-beam light distribution pattern P5 in coordination with the formation of the second reduced illuminance portion 44 in the ADB light distribution pattern P6. As a result, light distribution control can be simplified, and faster light distribution control and reduction in the load on the light distribution control device 8 can be achieved.

The embodiment of the present invention is described above in detail. The embodiment described above is merely a specific example of practicing the present invention. The details of the embodiment shall not be construed as limiting the technical scope of the present invention. A number of design modifications such as modification, addition, deletion, etc. of constituting elements may be made to the extent that they do not depart from the idea of the invention defined by the claims. New embodiments with design modifications will provide the combined advantages of the embodiment and the variation. Although the details subject to such design modification are emphasized in the embodiment described above by using phrases such as "of this embodiment" and "in this embodiment", details not referred to as such are also subject to design modification. Any combination of the above constituting elements is also useful as a mode of the present invention. Hatching in the cross section in the drawings should not be construed as limiting the material of the hatched object.

The light distribution control device 8 of the embodiment changes the illuminance in the first reduced illuminance portion 46 in accordance with the distance from the driver's vehicle to the vehicle in front 100, or in accordance with the position of the vehicle in front 100 or the first reduced illuminance portion 46 in the vehicle width direction, or in accordance with the dimension of the vehicle in front 100 or the first reduced illuminance portion 46 in the vehicle width direction. However, the invention is not limited to this, and the light distribution control device 8 may configure the illuminance in the first reduced illuminance portion 46 to be uniformly zero. This further simplifies light distribution control and more successfully achieves faster light distribution control and reduction in the load on the light distribution control device 8. Further, glare experienced by the driver of the vehicle in front can be further reduced.

The invention according to the embodiment described above may be defined by the following items.

[Item 1]

A vehicle light fixture system (1) including: a low-beam unit (2) adapted to form a low-beam light distribution pattern (P5) having a cutoff line (CL) and to independently adjust illuminance in a plurality of subareas (P3) in the low-beam light distribution pattern (P5) arranged below and along the cutoff line (CL); and a light distribution control device (8) that controls the low-beam unit (2) to form a first reduced illuminance portion (46) in, of the plurality of subareas (P3), the subarea having (P3) a position in a vehicle width direction overlapping a position of a vehicle in front (100) in the vehicle width direction.

[Item 2]

A light distribution control device (8) adapted to control a low-beam unit (2) adapted to form a low-beam light distribution pattern (P5) having a cutoff line (CL) and to independently adjust illuminance in a plurality of subareas (P3) in the low-beam light distribution pattern (P5) arranged below and along the cutoff line (CL), wherein the light distribution control device (8) controls the low-beam unit (2) to form a first reduced illuminance portion (46) in, of the plurality of subareas (P3), the subarea (P3) having a position in a vehicle width direction overlapping a position of a vehicle in front (100) in the vehicle width direction.

[Item 3]

A light distribution control method adapted to control formation of a low-beam light distribution pattern (P5) having a cutoff line (CL), the method including: forming a first reduced illuminance portion (46) in, of a plurality of subareas (P3) in the low-beam light distribution pattern (P5) arranged below and along the cutoff line (CL), the subarea (P3) having a position in a vehicle width direction overlapping a position of a vehicle in front (100) in the vehicle width direction.

What is claimed is:

1. A vehicle light fixture system comprising:
    a low-beam unit adapted to form a low-beam light distribution pattern having a cutoff line and to independently adjust illuminance in a plurality of subareas in the low-beam light distribution pattern arranged below and along the cutoff line; and
    a light distribution control device that controls the low-beam unit to form a first reduced illuminance portion in, of the plurality of subareas, the subarea having a position in a vehicle width direction overlapping a position of a vehicle in front in the vehicle width direction, wherein
    a range of the first reduced illuminance portion in a height direction is defined based on a pitching range of a driver's vehicle.

2. The vehicle light fixture system according to claim 1, wherein
    the light distribution control device lowers the illuminance in the first reduced illuminance portion as a distance to the vehicle in front becomes smaller.

3. The vehicle light fixture system according to claim 2, wherein
    the low-beam light distribution pattern includes a diffusion pattern extending in the vehicle width direction, the cutoff line located above the diffusion pattern, and the multiple subareas located below the cutoff line, and
    the low-beam unit includes: a first illuminator that includes an optical member for diffusing light of a light source in the vehicle width direction and forms the diffusion pattern; and a second illuminator that has a structured in which multiple light sources that can be turned on or off independently are arranged and forms the cutoff line and the multiple subareas.

4. The vehicle light fixture system according to claim 2, wherein
    the vehicle light fixture system includes an ADB unit adapted to form an ADB light distribution pattern at least a portion of which is formed in an area above the cutoff line and which includes a second reduced illuminance portion that overlaps the vehicle in front, and
    the light distribution control device defines the second reduced illuminance portion in the ADB light distribution pattern and defines the first reduced illuminance portion in, of the multiple subareas in the low-beam light distribution pattern, the subarea having a position in the vehicle width direction overlapping the position of the second reduced illuminance portion in the vehicle width direction.

5. The vehicle light fixture system according to claim 1, wherein
    the light distribution control device lowers the illuminance in the first reduced illuminance portion as the vehicle in front or the first reduced illuminance portion is positioned more outward in the vehicle width direction.

6. The vehicle light fixture system according to claim 5, wherein
    the low-beam light distribution pattern includes a diffusion pattern extending in the vehicle width direction, the cutoff line located above the diffusion pattern, and the multiple subareas located below the cutoff line, and
    the low-beam unit includes: a first illuminator that includes an optical member for diffusing light of a light source in the vehicle width direction and forms the diffusion pattern; and a second illuminator that has a structured in which multiple light sources that can be turned on or off independently are arranged and forms the cutoff line and the multiple subareas.

7. The vehicle light fixture system according to claim 5, wherein
    the vehicle light fixture system includes an ADB unit adapted to form an ADB light distribution pattern at least a portion of which is formed in an area above the cutoff line and which includes a second reduced illuminance portion that overlaps the vehicle in front, and
    the light distribution control device defines the second reduced illuminance portion in the ADB light distribution pattern and defines the first reduced illuminance portion in, of the multiple subareas in the low-beam light distribution pattern, the subarea having a position in the vehicle width direction overlapping the position of the second reduced illuminance portion in the vehicle width direction.

8. The vehicle light fixture system according to claim 1, wherein
    the light distribution control device lowers the illuminance in the first reduced illuminance portion as the dimension of the vehicle in front or the first reduced illuminance portion in the vehicle width direction becomes larger.

9. The vehicle light fixture system according to claim 8, wherein
    the low-beam light distribution pattern includes a diffusion pattern extending in the vehicle width direction, the cutoff line located above the diffusion pattern, and the multiple subareas located below the cutoff line, and
    the low-beam unit includes: a first illuminator that includes an optical member for diffusing light of a light source in the vehicle width direction and forms the diffusion pattern; and a second illuminator that has a structured in which multiple light sources that can be turned on or off independently are arranged and forms the cutoff line and the multiple subareas.

10. The vehicle light fixture system according to claim 8, wherein
    the vehicle light fixture system includes an ADB unit adapted to form an ADB light distribution pattern at least a portion of which is formed in an area above the cutoff line and which includes a second reduced illuminance portion that overlaps the vehicle in front, and
    the light distribution control device defines the second reduced illuminance portion in the ADB light distribution pattern and defines the first reduced illuminance portion in, of the multiple subareas in the low-beam light distribution pattern, the subarea having a position in the vehicle width direction overlapping the position of the second reduced illuminance portion in the vehicle width direction.

11. The vehicle light fixture system according to claim 1, wherein
the light distribution control device configures the illuminance in the first reduced illuminance portion to be zero.

12. The vehicle light fixture system according to claim 11, wherein
the low-beam light distribution pattern includes a diffusion pattern extending in the vehicle width direction, the cutoff line located above the diffusion pattern, and the multiple subareas located below the cutoff line, and
the low-beam unit includes: a first illuminator that includes an optical member for diffusing light of a light source in the vehicle width direction and forms the diffusion pattern; and a second illuminator that has a structured in which multiple light sources that can be turned on or off independently are arranged and forms the cutoff line and the multiple subareas.

13. The vehicle light fixture system according to claim 11, wherein
the vehicle light fixture system includes an ADB unit adapted to form an ADB light distribution pattern at least a portion of which is formed in an area above the cutoff line and which includes a second reduced illuminance portion that overlaps the vehicle in front, and
the light distribution control device defines the second reduced illuminance portion in the ADB light distribution pattern and defines the first reduced illuminance portion in, of the multiple subareas in the low-beam light distribution pattern, the subarea having a position in the vehicle width direction overlapping the position of the second reduced illuminance portion in the vehicle width direction.

14. The vehicle light fixture system according to claim 1, wherein
the low-beam light distribution pattern includes a diffusion pattern extending in the vehicle width direction, the cutoff line located above the diffusion pattern, and the multiple subareas located below the cutoff line, and
the low-beam unit includes: a first illuminator that includes an optical member for diffusing light of a light source in the vehicle width direction and forms the diffusion pattern; and a second illuminator that has a structured in which multiple light sources that can be turned on or off independently are arranged and forms the cutoff line and the multiple subareas.

15. The vehicle light fixture system according to claim 14, wherein
the vehicle light fixture system includes an ADB unit adapted to form an ADB light distribution pattern at least a portion of which is formed in an area above the cutoff line and which includes a second reduced illuminance portion that overlaps the vehicle in front, and
the light distribution control device defines the second reduced illuminance portion in the ADB light distribution pattern and defines the first reduced illuminance portion in, of the multiple subareas in the low-beam light distribution pattern, the subarea having a position in the vehicle width direction overlapping the position of the second reduced illuminance portion in the vehicle width direction.

16. The vehicle light fixture system according to claim 1, wherein
the vehicle light fixture system includes an ADB unit adapted to form an ADB light distribution pattern at least a portion of which is formed in an area above the cutoff line and which includes a second reduced illuminance portion that overlaps the vehicle in front, and
the light distribution control device defines the second reduced illuminance portion in the ADB light distribution pattern and defines the first reduced illuminance portion in, of the multiple subareas in the low-beam light distribution pattern, the subarea having a position in the vehicle width direction overlapping the position of the second reduced illuminance portion in the vehicle width direction.

17. A light distribution control device adapted to control a low-beam unit adapted to form a low-beam light distribution pattern having a cutoff line and to independently adjust illuminance in a plurality of subareas in the low-beam light distribution pattern arranged below and along the cutoff line, wherein
the light distribution control device controls the low-beam unit to form a first reduced illuminance portion in, of the plurality of subareas, the subarea having a position in a vehicle width direction overlapping a position of a vehicle in front in the vehicle width direction, and
a range of the first reduced illuminance portion in a height direction is defined based on a pitching range of a driver's vehicle.

18. A light distribution control method adapted to control formation of a low-beam light distribution pattern having a cutoff line, the method comprising:
forming a first reduced illuminance portion in, of a plurality of subareas in the low-beam light distribution pattern arranged below and along the cutoff line, the subarea having a position in a vehicle width direction overlapping a position of a vehicle in front in the vehicle width direction, wherein
a range of the first reduced illuminance portion in a height direction is defined based on a pitching range of a driver's vehicle.

* * * * *